(12) United States Patent
Henein

(10) Patent No.: US 11,055,431 B2
(45) Date of Patent: Jul. 6, 2021

(54) SECURING DATA STORAGE OF PERSONALLY IDENTIFIABLE INFORMATION IN A DATABASE

(71) Applicant: BlackBerry Limited, Waterloo (CA)

(72) Inventor: Nader Saad Henein, Dubai (AE)

(73) Assignee: BlackBerry Limited, Waterloo (CA)

( * ) Notice: Subject to any disclaimer, the term of this patent is extended or adjusted under 35 U.S.C. 154(b) by 189 days.

(21) Appl. No.: 15/844,181

(22) Filed: Dec. 15, 2017

(65) Prior Publication Data

US 2019/0188409 A1    Jun. 20, 2019

(51) Int. Cl.
  *G06F 21/00* (2013.01)
  *G06F 21/62* (2013.01)
  *G06F 16/22* (2019.01)
  *G06F 16/2457* (2019.01)

(52) U.S. Cl.
  CPC ...... *G06F 21/6245* (2013.01); *G06F 16/2255* (2019.01); *G06F 16/2282* (2019.01); *G06F 16/2457* (2019.01)

(58) Field of Classification Search
  CPC ............. G06F 21/6245; G06F 16/2255; G06F 16/2282; G06F 16/2457; G06F 21/6254; G06Q 30/0615; G06Q 30/02; H04L 63/0421
  See application file for complete search history.

(56) References Cited

U.S. PATENT DOCUMENTS

| | | | |
|---|---|---|---|
| 6,275,824 B1 * | 8/2001 | O'Flaherty | G06F 21/6227 |
| 6,480,850 B1 * | 11/2002 | Veldhuisen | G06F 21/6245 |
| | | | 707/610 |
| 7,562,067 B2 | 7/2009 | Chaudhuri et al. | |
| 7,797,342 B2 | 9/2010 | Banks et al. | |

(Continued)

FOREIGN PATENT DOCUMENTS

JP    2004048809 A  *  2/2004

OTHER PUBLICATIONS

Insert Values from One Database Table to Another Database Table in SQL Server, c-sharpcorner, Jul. 16, 2014, https://web.archive.org/web/20160123170319/https://www.c-sharpcorner.com/blogs/insert-values-from-one-database-table-to-another-database-table-in-sql-server1.*

(Continued)

*Primary Examiner* — Jeffery L Williams
(74) *Attorney, Agent, or Firm* — Fish & Richardson P.C.

(57) ABSTRACT

Systems, methods, and software can be used to secure storage of personally identifiable information. In some aspects, a method includes receiving, by at least one hardware processor, a request to store a data record, wherein the data record comprises personally identifiable information for a person; dividing, by the at least one hardware processor, the data record into at least two data entries, each of the at least two data entry comprising a respective portion of the personally identifiable information; selecting, by the at least one hardware processor, a database cell for each of the at (Continued)

least two data entries to store the respective portion of the personally identifiable information, wherein the database cells for different data entries are in different database tables, different database rows, or different database columns; and storing, by the at least one hardware processor, the at least two data entries in the selected database cells.

14 Claims, 5 Drawing Sheets

(56) References Cited

U.S. PATENT DOCUMENTS

| | | | | |
|---|---|---|---|---|
| 8,136,031 | B2* | 3/2012 | Massand | G06F 40/194 |
| | | | | 715/229 |
| 8,180,744 | B2* | 5/2012 | Deolalikar | G06F 16/2255 |
| | | | | 707/695 |
| 8,370,340 | B1* | 2/2013 | Yu | H04L 51/12 |
| | | | | 707/724 |
| 8,935,797 | B1* | 1/2015 | Silver | G06Q 20/34 |
| | | | | 726/26 |
| 9,043,342 | B2* | 5/2015 | Milman | G06F 21/6245 |
| | | | | 707/754 |
| 9,122,880 | B2* | 9/2015 | Arya | G06F 21/60 |
| 9,128,976 | B2* | 9/2015 | Bristol | G06F 16/214 |
| 9,129,118 | B1* | 9/2015 | Johansson | G06F 21/6227 |
| 9,703,539 | B2* | 7/2017 | Abel | G06F 8/61 |
| 10,282,802 | B2* | 5/2019 | Poder | G06T 1/0071 |
| 10,410,014 | B2* | 9/2019 | Allen | G06F 21/6245 |
| 2006/0053112 | A1 | 3/2006 | Chitkara et al. | |
| 2007/0078871 | A1* | 4/2007 | Iverson | G06F 21/6254 |
| 2009/0204566 | A1* | 8/2009 | Barsness | G06F 16/2255 |
| 2010/0318489 | A1* | 12/2010 | De Barros | G06N 5/04 |
| | | | | 706/50 |
| 2015/0213288 | A1* | 7/2015 | Bilodeau | G06F 21/552 |
| | | | | 726/26 |
| 2016/0275272 | A1* | 9/2016 | Koshinuma | G06F 21/31 |
| 2016/0306999 | A1* | 10/2016 | Beinhauer | G06F 21/6254 |
| 2016/0342811 | A1* | 11/2016 | Whitcomb | G16H 10/60 |
| 2017/0315683 | A1* | 11/2017 | Boucher | G06F 3/0486 |
| 2018/0129820 | A1* | 5/2018 | Sahter | H04L 63/102 |
| 2020/0311299 | A1* | 10/2020 | Amar | H04L 9/3213 |

OTHER PUBLICATIONS

Selecting Data from More than One Table by Using Joins, SAS, Jul. 12, 2011, http://support.sas.com/documentation/cdl/en/sqlproc/63043/HTML/default/viewer.htm#p0o4a5ac71mcchn1kc1zhxdnm139.htm.*

Inserting into multiple tables, WROX, Jul. 2012, https://web.archive.org/web/20120728031803/https://p2p.wrox.com/sql-server-2000/24466-inserting-into-multiple-tables.html.*

SQL Create Table Statement, Tutorial Republic, Feb. 2017, https://web.archive.org/web/20170221010909/https://www.tutorialrepublic.com/sql-tutorial/sql-create-table-statement.php.*

USER_ID (Transact-SQL), Microsoft, Mar. 2017, https://docs.microsoft.com/en-US/sql/t-sql/functions/user-id-transact-sql?view=sql-server-2017.*

Hash a SQL row?, StackOverFlow, Jun. 2012, https://stackoverflow.com/questions/11186183/hash-a-sql-row/38745587.*

SQL Server RAND( ) Function, W3schools, Sep. 2017, https://web.archive.org/web/20170901082842/https://www.w3schools.com/sql/func_sqlserver_rand.asp.*

(Matthew Huntbach, Hash tables: the student database examples, part 2, Nov. 6, 2012, https://web.archive.org/web/20121201000000*/http://www.eecs.qmul.ac.uk/~mmh/DCS128/2006/resources/hashtables.html, hereinafter Huntbach).*

* cited by examiner

SECURING DATA STORAGE OF PERSONALLY IDENTIFIABLE INFORMATION IN A DATABASE

TECHNICAL FIELD

The present disclosure relates to the software technology and, more specifically, to securing data storage of personally identifiable information (PII) in a database.

BACKGROUND

In the context of privacy protections in software, personally identifiable information (PII), refers to information relating to an identified or identifiable natural person. In other words, PII is data that can be used to identify, contact, or locate a single person, to identify an individual in context, or to distinguish one person from another. In some cases, PII can be referred to as sensitive personal information (SPI), or personal information. PII can include information that can be used to distinguish or trace a particular individual's identity, such as name, social security number (SSN), date and place of birth, mother's maiden name, or biometric records, and other information that is linked or linkable to the particular individual, such as medical, educational, financial, and employment information. For example, the following information has been classified by National Institute of Standards and Technology (NIST) as PII, including Full name (if not common), Home address, Email address (if private from an association/club membership, etc.), National identification number, Passport number, Internet Protocol (IP) address (when linked), Vehicle registration plate number, Driver's license number, Face, fingerprints or handwriting, Credit card numbers, Digital identity, Date of birth, Birthplace, Genetic information, Telephone number, Login name, screen name, nickname, or handle.

DESCRIPTION OF DRAWINGS

Like reference numbers and designations in the various drawings indicate like elements.

DETAILED DESCRIPTION

Figure 1:
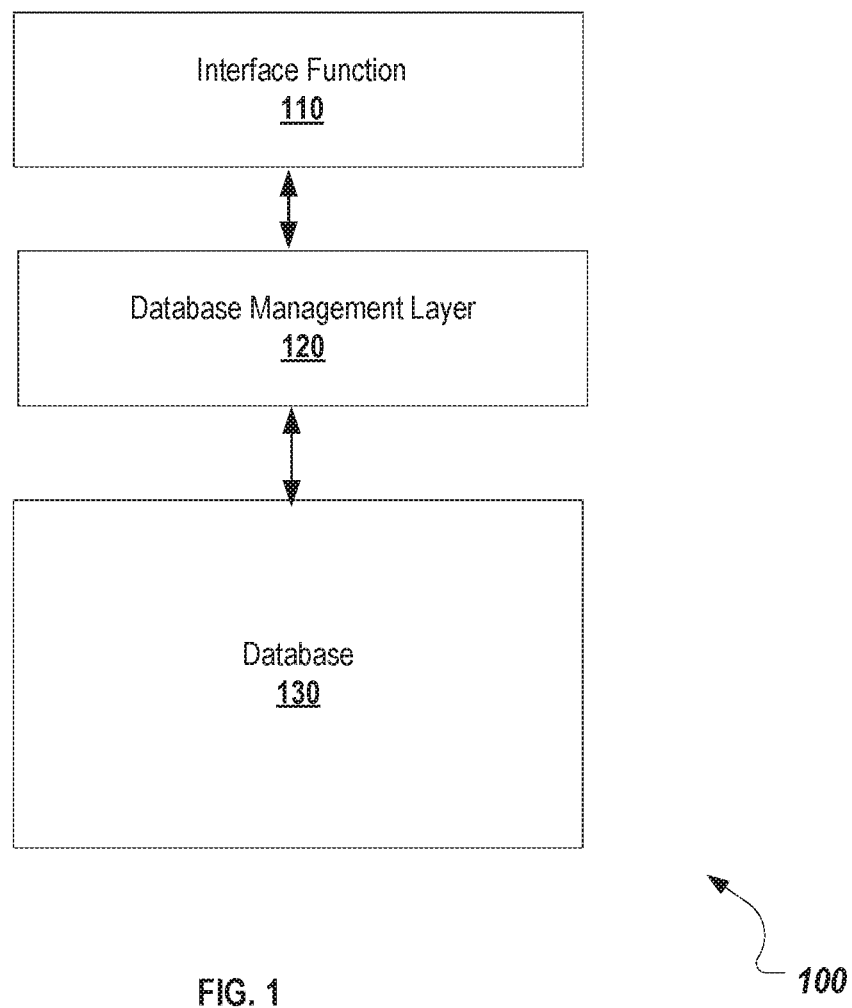
FIG. 1 is a schematic diagram showing an example database system that secures PII storage, according to an implementation.

PII is commonly stored in database structures capable of holding massive amounts of digital data. The PII of a particular individual generally includes a plurality of portions, for example, the individual's name, identification number such as national identification number, national identity number, national insurance number, personal identity number, citizen service number, or SSN, home address, work address, one or more email addresses, one or more phone numbers, one or more social media handles, or any combinations thereof. These portions of PII are often stored in database entries that are linked so that they can easily be accessed and read. For example, several portions of the PII can be stored in the same row of a table so that they can easily refer to each other. If some portions of the PII of the individual are stored in different tables, a same identifier (ID) can be used in these different tables to refer to the row in each table that stores the PII of the individual. Therefore, the PII of the same individual can be easily retrieved from multiple tables using the same ID.

Databases storing PII may subject to security attacks. In some cases, an attacker can invade the platform that stores the database and retrieve, copy, or otherwise obtain the data stored in the database. Because the PII for an individual is linked in the database, the attacker can extract the PII for each individual easily from the database once the attacker gains access to the database.

In some cases, to protect from attackers, databases storing PII can be encrypted. Thus even if the attacker gains access to the data in the database, the attacker cannot retrieve meaningful information without the security keys. However, encryption makes it difficult to perform the searching and indexing functionality of database, because the encrypted data does not reflect the original meaning or context of the original data.

In some implementations, the PII can be divided into different portions. Each of the portions can be stored in database cells that are in different rows, different columns, different tables, or both. By breaking the linkages of different portions of the PII, the information in the database is no longer identifiable. For example, if the first name, the last name, and the SSN of a person are each stored in a different row and different table, an attacker who gains the access to the table does not obtain meaningful information about the person. In some cases, a database management layer (DML) can be implemented to determine database entries for different portions of the PII and carry out read, write, delete, update or other data entry tasks accordingly. Instead of securing the entire database, which can be vast and diversely stored in different locations, the PII can be secured by securing the ABL, which can include small amounts of software codes, and stored in secure locations. Furthermore, this approach can maintain the searching and indexing functionalities of the database. FIGS. 1-5 and associated descriptions provide additional implementations of these features.

FIG. 1 is a schematic diagram showing an example database system 100 that secures PII storage, according to an implementation. At a high level, the example system 100 includes an interface function 110, a database management layer (DML) 120, and database 130.

The interface function 110 represents an application, a set of applications, software, software modules, hardware, or any combination thereof that can be configured to receive and respond to database queries. For example, the interface function 110 can receive a request to read, write, or delete the PII of a person. The interface function 110 can send the request to the DML 120, receive PII from the DML 120, and send the PII to the entity that sends the request.

The DML 120 represents an application, a set of applications, software, software modules, hardware, or any combination thereof, that can be configured to store and retrieve PII from the database 130. The DML 120 includes software modules that can determine a user ID associated with the person for which the PII is requested, determine database cells that store different data entries for respective portion of the PII, and send commands to the database 130 to write to or read from each portion of the PII respective database cells. FIGS. 2-5 and associated descriptions provide additional details of these implementations.

The database 130 represents an application, a set of applications, software, software modules, hardware, or any combination thereof that can be configured to store PII data. For example, the database 130 can be an object-oriented database, a relational database, or any other databases that save PII data. In some cases, the database 130 can be organized as multiple tables. The database 130 can be stored in the same or different computing platforms as the DML 120. The database 130 can also include multiple databases that are stored in different computing platforms.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 2:
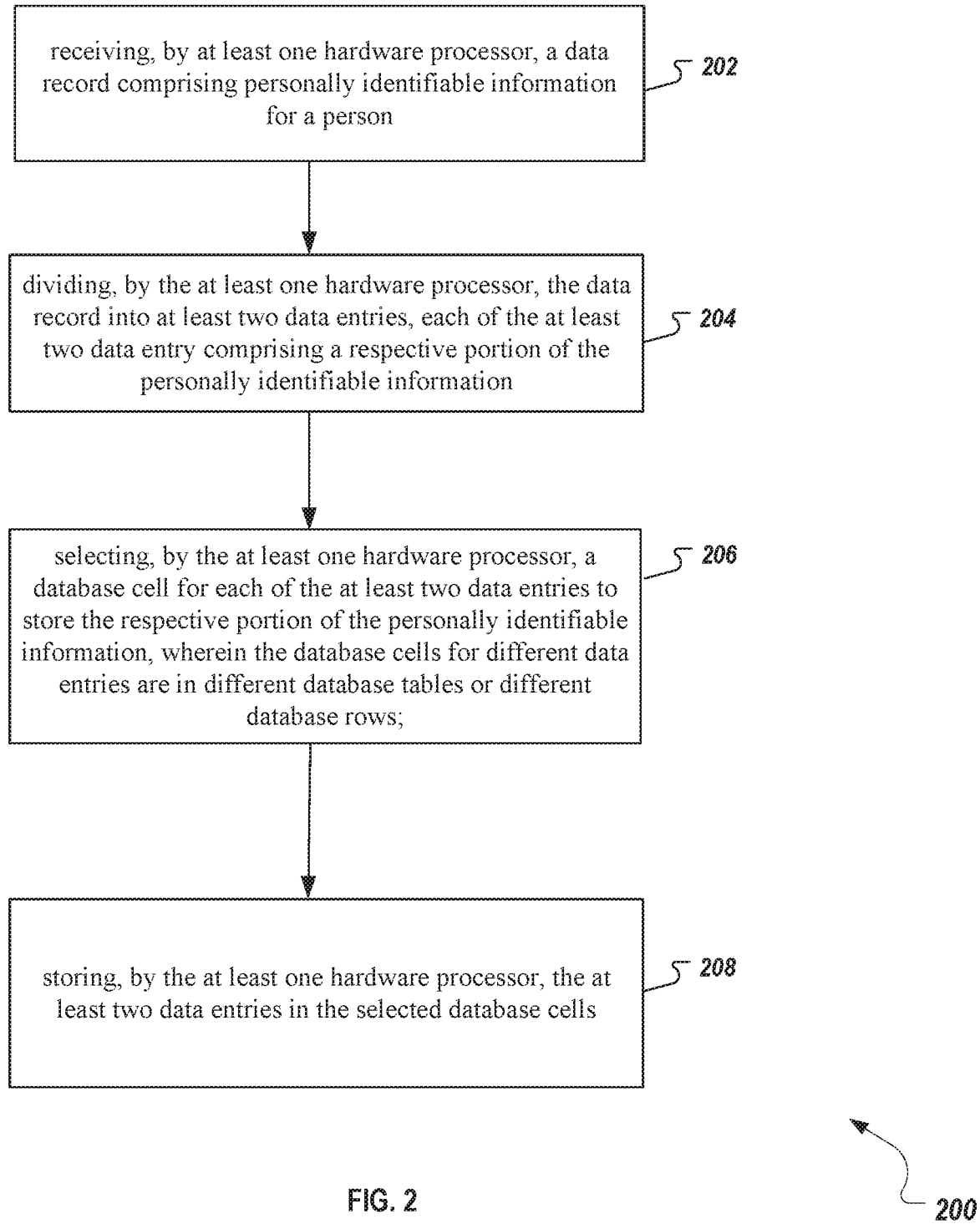
FIG. 2 is a flow diagram showing an example method for writing PII securely in a database, according to an implementation.

FIG. 2 is a flow diagram showing an example method 200 for writing PII securely in a database, according to an implementation. The method 200 can be implemented by the DML 120 illustrated at FIG. 1. The method 200 can also be implemented using additional, fewer, or different entities. The method 200 can be implemented using additional, fewer, or different operations, which can be performed in the order shown or in a different order.

The example method 200 begins at 202, where a data record including PII for a person is received. The data record can be received by user inputs from a terminal, for example, in a data entry operation. The data record can also be received from a file, for example, by parsing an input file that includes PII for many people. The data record can also be received over a wireline or a wireless network. In some cases, the data record can be received in a request to store the PII, or overwrite the existing PII for the person.

At 204, the data record is divided into multiple data entries. Each data entry includes a respective portion of the PII. For example, the data record can include the first name, the last name, the SSN, the phone number, the home address, and the email address of the person. The PII can be divided into multiple data entries: the first data entry includes the first name of the person, the second data entry includes the last name of the person, the third data entry includes the SSN of the person, the fourth, the fifth, and the sixth data entries include the phone number, the home address, and the email address of the person, respectively.

Figure 5:
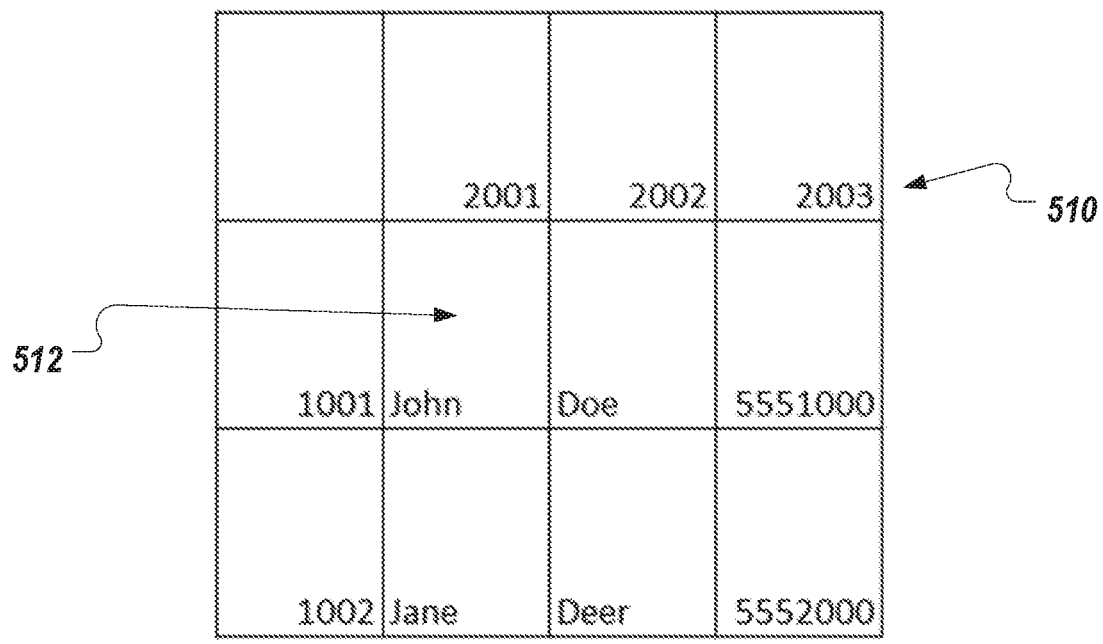
FIG. 5 illustrates the structure of an example database, according to an implementation.
Figure 5:
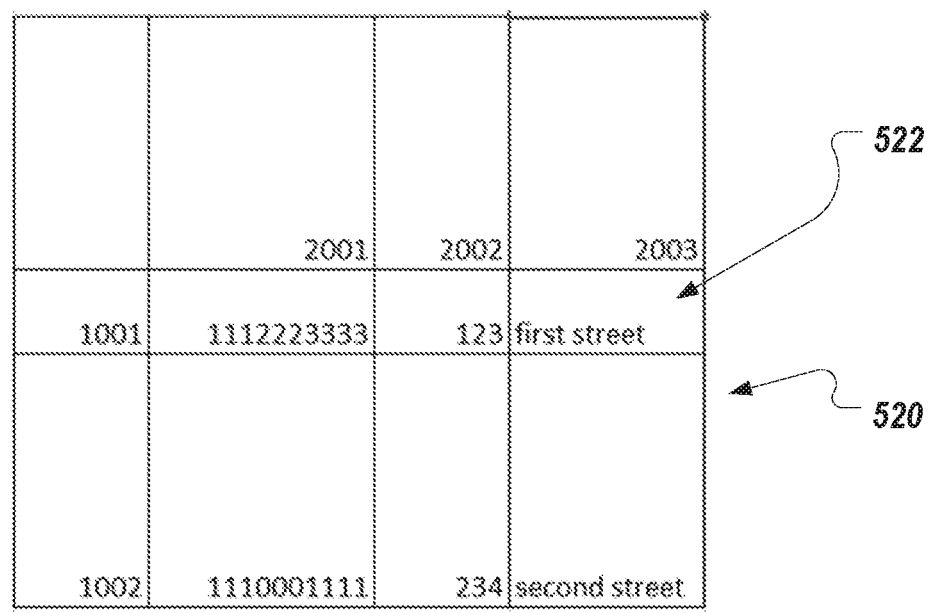

At 206, for each data entry, a database location is selected to store the respective portion of the PII. In some implementations, the database can be organized into multiple tables, each tables can have multiple cells that are organized in a row-by-column structure. Each database location can be a cell in the table. FIG. 5 illustrates the structure of an example database 500, according to an implementation. As illustrated, the database 500 includes tables 510 and 520. Each table includes multiple rows and columns. In some cases, a table ID can be assigned to each table, a row ID can be assigned to each row, and a column ID can be assigned to each column. Thus, each database location (cell) can be addressed by the combination of table ID, row ID, and column ID. In the illustrated example, cell 512, the database location storing the data "John," can be addressed by "table ID=510, row ID=1001, column ID=2001." Cell 522, the database location storing the data "first street," can be addressed by "table ID=520, row ID=1001, column ID=2003." The database 500 can have more than two tables and each table can have more rows and columns than illustrated.

In order to break the linkage between different portions of PII for the same person, database cells in different database tables, different database rows, different database columns, or a combination thereof, are selected for each data entry. For example, the data record includes PII for a person named "John Deer" that lives at "123 second street." The data record is divided into four data entries, each holding a portion of the PII. The first data entry includes the first name "John," the second data entry includes the last name "Deer," the third data entry includes the street number "123," and the fourth data entry includes the street name "second street." Cells in different tables and different rows are selected to store these data entries. As illustrated, the first name and the last name are stored in different rows. The street number and the street name are stored in different rows. The name (first or last name) and the address (number or name) are stored in different tables. In some implementations, these four entries can be stored in four different tables and in four different rows so that their linkages are further severed. While the columns are maintained in a readable fashion, for example, column 2001 of the table 510 stores first names, column 2002 of the table 510 stores last names, each row of information does not correspond to the same person and therefore the information in the tables is no longer identifiable. In some implementations, the linkage between the columns can be further broken. For example, both the cell 512 and the cell 522 can be used to store first names. In some implementations, the rows and columns can be interchanged. For example, row 1001 of the table 510 can store first names, row 1002 can store last names.

Returning to FIG. 2, in some implementations, the selection can be performed based on a user ID associated with the data record. Each data record for a person can be assigned with a user ID. In one example, the user ID can be a random number that is generated using a pseudo-random number generator. Alternatively or in combination, the user ID can be generated based on one or more portion of the PII in the data record, for example, the SSN, the birthday, the name, or a combination thereof. In one example, the user ID can be generated by adding, appending, or otherwise combining the SSN and birthday. In another example, the user ID can be generated by converting letters in the name into hexadecimal numbers. In some cases, for example if the user ID is generated randomly, an association between the user ID and some information of the PII, e.g., name, SSN, or birthday, can be stored in a table at the DML 120.

The user ID can be used as an input to a one-way hashing function to generate an output. The output can be the row ID of the selected data cell for one data entry. Other one-way hashing functions can be used to generate the table ID of the selected data cell, the column ID of the selected data cell, the row IDs, table IDs, column IDs of other data entries, or any combinations thereof. In some cases, if one row ID or one table ID has been selected for a data entry for one portion of the PII, the same row ID or table ID is excluded from being selected by other data entries for the same PII. In some cases, instead of selecting all three IDs using hashing functions, the column ID, the table ID, or both can be selected based on the type of the portion of the PII in the data entry. For example, if the data entry is to store first name, column 2001 and table 210 are selected, while the row ID is selected randomly for each data entry. Examples of the one-way hashing function include the MD5 hashing function and the Secure Hash Algorithm 1 (SHA-1) hashing function.

In some implementations, a cell bag can be maintained. The cell bag can include the cells that have not been assigned to store any data entries. Each cell can be identified by its table ID, row ID, and column ID. If the request is to write PII for a new person, during the selection process, the hashing functions can be configured to output the unassigned cells in the cell bag. Once a cell is assigned, the cell is removed from the cell bag. If a request is received to delete a data record, the cells for data entries of the data record are deposited into the cell bag. The content of the database cells to be deleted can be discarded or kept.

At 208, the data entries are stored into the selected database cell. The data entry can be stored by performing a writing function to write each portion of PII in the data entry at the corresponding database cell.

Figure 3:
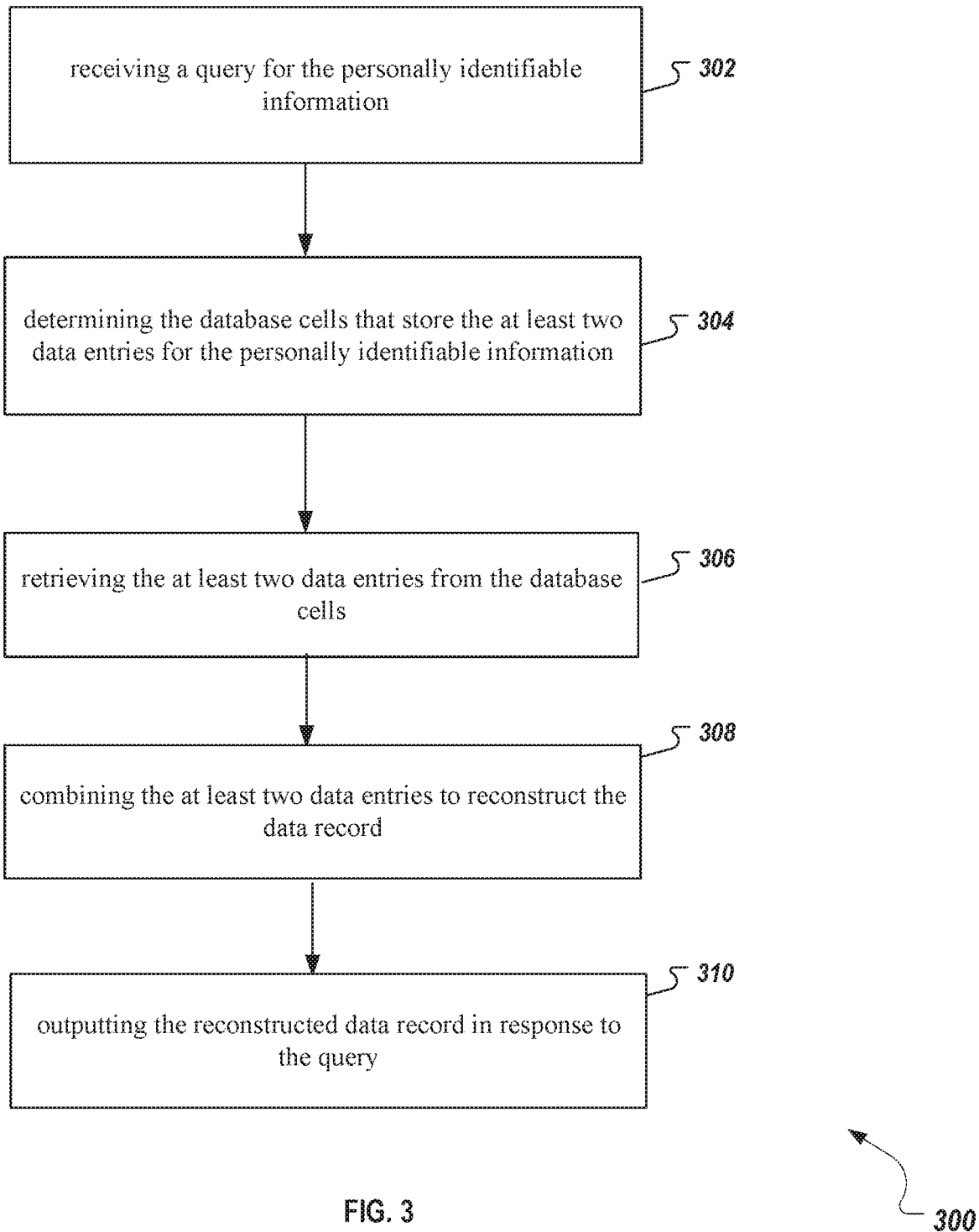
FIG. 3 is a flow diagram showing an example method for reading PII from a database, according to an implementation.

FIG. 3 is a flow diagram showing an example method 300 for reading PII from a database, according to an implementation. The method 300 can be implemented using additional, fewer, or different operations, which can be performed in the order shown or in a different order.

The example method 300 begins at 302, where a query for PII of a person is received. The query can be received based on user input from a terminal, from another software application, over a wireless or wireline network, or any combinations thereof. At 304, the database cells that store the data entries for the PII of the person are determined. As discussed previously, different portions of the PII of the person are stored in different database cells. Accordingly, each of the different database cells is determined at this step. In some implementations, a table ID, a row ID, and a column ID are determined for each database cell storing a portion of the PII.

In some cases, a user ID for the person for which the PII is requested is determined. The user ID is used to generate the location of the database entries, e.g., the table ID, row ID, column ID, or any combinations thereof. As discussed previously in FIG. 2, using the user ID as inputs, hashing functions can be used to generate the table ID, row ID, column ID, or any combinations thereof for different data entries storing portions of the PII.

In some cases, as discussed previously, an association of the user ID and some information of the person, e.g., birthday or SSN, can be stored in a table in the DML 120. The query can include the associated information, and a table look-up can be performed to find the user ID based on the associated information. Alternatively or in combination, the user ID can be generated based on some information of the person. In these or other cases, such information can also be included in the query. The same technique that generates the user ID during the writing operation discussed in FIG. 2 can be used to re-generate the user ID during the reading operation.

At 306, the data entries stored in the determined database cells are retrieved from the database. At 308, these data entries are combined to reconstruct the data record that includes the PII of the person. At 310, the reconstructed data record is outputted in response to the query. The reconstructed data record can be outputted using a user interface, for example a display, or outputted by transmitting to the entity, for example a software application, a client device over a network, or any combinations thereof, that sends the query to request the PII.

During an update operation, the database entries storing the PII can be determined as the reading operation, the PII can be subsequently written into the determined database entries.

Figure 4:
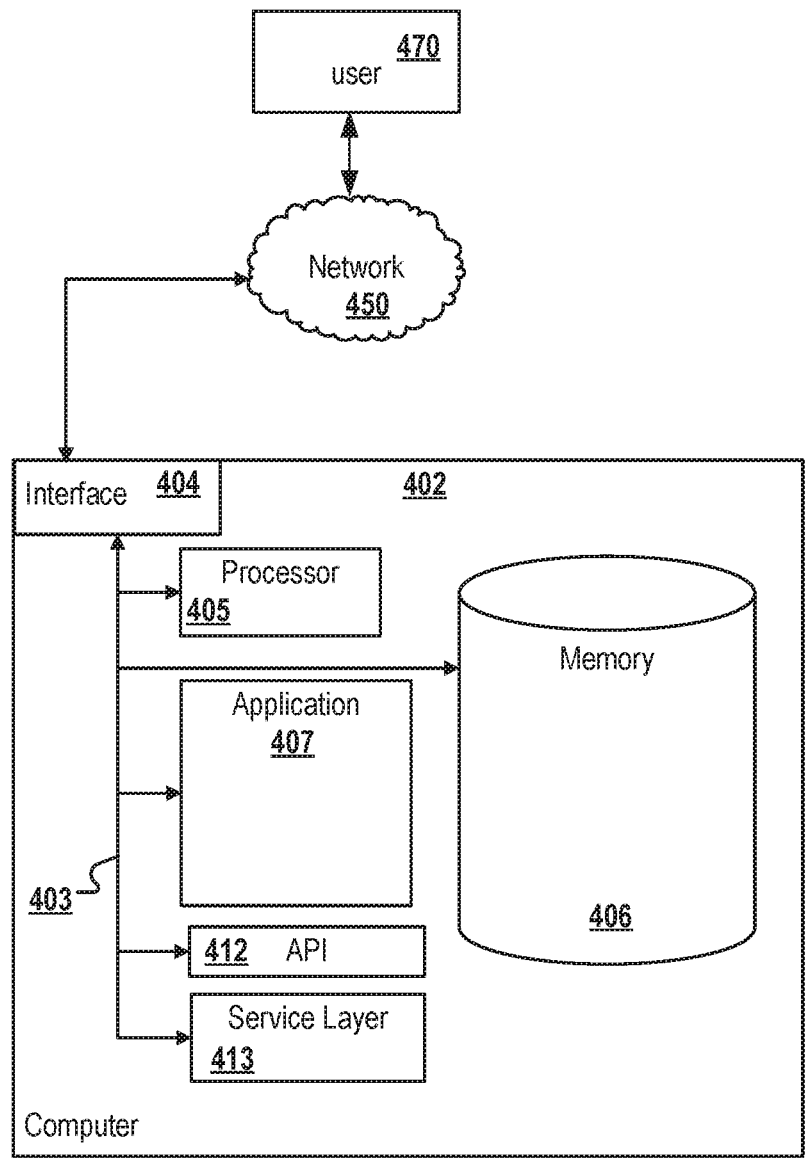
FIG. 4 is a high-level architecture block diagram of a computing system, according to an implementation.

FIG. 4 is a high-level architecture block diagram of a computing system 400, according to an implementation. At a high level, the illustrated system 400 includes a computer 402 that is communicably coupled with a network 450. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The network 450 facilitates communications between the components of the system 400. In some cases, a user 470 can access the computer 402 from a remote network. In these or other cases, the network 450 can be a wireless or a wireline network. In some cases, the user 470 can access the computer 402 locally. In these or other cases, the network 450 can also be a memory pipe, a hardware connection, or any internal or external communication path between the components. The user 470 can be an administrator, a data entry operator, a data requestor or any other persons that read, write, update, or delete PII.

The computer 402 includes a computing system configured to perform the algorithm described in this disclosure. For example, the computer 402 can be used to implement the DML. In some cases, the algorithm can be implemented in an executable computing code, e.g., C/C++ executable codes. Alternatively or in combination, the algorithm can be implemented in an application program, e.g., EXCEL. In some cases, the computer 402 can include a standalone LINUX system that runs batch applications. In some cases, the computer 402 can include mobile or personal computers that run the application program.

The computer 402 may include an input device, such as a keypad, keyboard, touch screen, microphone, speech recognition device, other device that can accept user information, and/or an output device that conveys information associated with the operation of the computer 402, including digital data, visual and/or audio information, or a GUI.

The computer 402 can serve as a client, network component, a server, a database or other persistency, and/or any other component of the system 400. In some implementations, one or more components of the computer 402 may be configured to operate within a cloud-computing-based environment.

At a high level, the computer 402 is an electronic computing device operable to receive, transmit, process, store, or manage data and information associated with the system 400. According to some implementations, the computer 402 may also include, or be communicably coupled with, an application server, e-mail server, web server, caching server, streaming data server, business intelligence (BI) server, and/or other server.

The computer 402 can receive requests over network 450 from a client application (e.g., executing on another computer 402) and respond to the received requests by processing the said requests in an appropriate software application. In addition, requests may also be sent to the computer 402 from internal users (e.g., from a command console or by another appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403, using an application programming interface (API) 412 and/or a service layer 413. The API 412 may include specifications for routines, data structures, and object classes. The API 412 may be either computer language-independent or -dependent and refer to a complete interface, a single function, or even a set of APIs. The service layer 413 provides software services to the computer 402 and/or the system 400. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in Extensible Markup Language (XML) format or other suitable format. While illustrated as an integrated component of the computer 402, alternative implementations may illustrate the API 412 and/or the service layer 413 as stand-alone components in relation to other components of the computer 402. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, configurations, or particular implementations of the computer 402. The interface 404 is used by the computer 402 for communicating with other systems in a distributed environment—including within the system 400—connected to the network 450—(whether illustrated or not). Generally, the interface 404 comprises logic encoded in software and/or hardware in a suitable combination and operable to communicate with the network 450. More specifically, the interface 404 may comprise software supporting one or more communication protocols associated with communications such that the network 450 or interface's hardware is operable to communicate physical signals within and outside of the illustrated system 400.

The computer 402 includes a processor 405. Although illustrated as a single processor 405 in FIG. 4, two or more processors may be used according to particular needs, configurations, or particular implementations of the computer 402. Generally, the processor 405 executes instructions and manipulates data to perform the operations of the computer 402. In some cases, the processor 405 can include a data processing apparatus.

The computer 402 also includes a memory 406 that holds data for the computer 402. Although illustrated as a single memory 406 in FIG. 4, two or more memories may be used according to particular needs, configurations, or particular implementations of the computer 402. While memory 406 is illustrated as an integral component of the computer 402, in alternative implementations, memory 406 can be external to the computer 402.

The application 407 is an algorithmic software engine providing functionality according to particular needs, configurations, or particular implementations of the computer 402, particularly with respect to functionality required for performing the algorithm described herein. Although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, the system 400 and communicating over network 450. Further, the terms "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can comprise or be embedded in another device, e.g., a mobile telephone, a personal digital assistant (PDA), a mobile audio or video player, a game console, a global positioning system (GPS) receiver, a vehicle, a smartphone, an endpoint, an accessory, a wearables device such as a smart watch or smart glasses, a health/medical device, a robot, an Internet of Thing (IoT) device, an Enterprise of Thing (EoT) device, or a portable storage device such as a universal serial bus (USB) flash drive.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method for storing personally identifiable information, comprising:
    receiving, by at least one hardware processor, a request to store a data record, wherein the data record comprises personally identifiable information for a person;
    dividing, by the at least one hardware processor, the data record into at least two portions of the personally identifiable information;
    selecting, by the at least one hardware processor, a database table cell for each portion of the at least two portions of the personally identifiable information, wherein the database table cells for different portions of the personally identifiable information for the same person are in different database rows, and wherein selecting the database table cell comprises:
        determining a user ID associated with the personally identifiable information; and
        determining, based on the user ID using a hashing function, at least one of a row ID, a table ID, or a column ID of each database table cell storing the respective portion of the personally identifiable information; and
    storing, by the at least one hardware processor, the at least two portions of the personally identifiable information in the selected database table cells.

2. The method of claim 1, further comprising:
    receiving a query for the personally identifiable information;
    determining the database table cells that store the at least two portions of the personally identifiable information for the personally identifiable information;
    retrieving the at least two portions of the personally identifiable information from the database table cells;
    combining the at least two portions of the personally identifiable information to reconstruct the data record; and
    outputting the reconstructed data record in response to the query.

3. The method of claim 1, wherein the at least two portions of the personally identifiable information comprise a first portion and a second portion, the first portion comprises a name of the person, and the second portion comprises at least one of an identification number, a phone number, a home address, or an email address of the person.

4. The method of claim 1, wherein the user ID is determined based on the personally identifiable information.

5. The method of claim 1, wherein the user ID is determined using a random number generator.

6. A non-transitory computer-readable medium storing instructions which, when executed, cause a computing device to perform operations comprising:
    receiving, by at least one hardware processor, a request to store a data record, wherein the data record comprises personally identifiable information for a person;
    dividing, by the at least one hardware processor, the data record into at least two portions of the personally identifiable information;
    selecting, by the at least one hardware processor, a database table cell for each portion of the at least two portions of the personally identifiable information, wherein the database table cells for different portions of the personally identifiable information for the same person are in different database rows, and wherein selecting the database table cell comprises:
        determining a user ID associated with the personally identifiable information; and
        determining, based on the user ID using a hashing function, at least one of a row ID, a table ID, or a column ID of each database table cell storing the respective portion of the personally identifiable information; and
    storing, by the at least one hardware processor, the at least two portions of the personally identifiable information in the selected database table cells.

7. The computer-readable medium of claim 6, the operations further comprising:
    receiving a query for the personally identifiable information;
    determining the database table cells that store the at least two portions of the personally identifiable information for the personally identifiable information;
    retrieving the at least two portions of the personally identifiable information from the database table cells;
    combining the at least two portions of the personally identifiable information to reconstruct the data record; and
    outputting the reconstructed data record in response to the query.

8. The computer-readable medium of claim 6, wherein the at least two portions of the personally identifiable information comprise a first portion and a second portion, the first portion comprises a name of the person, and the second portion comprises at least one of an identification number, a phone number, a home address, or an email address of the person.

9. The computer-readable medium of claim 6, wherein the user ID is determined based on the personally identifiable information.

10. The computer-readable medium of claim 6, wherein the user ID is determined using a random number generator.

11. A device, comprising:
    at least one hardware processor; and
    a non-transitory computer-readable storage medium coupled to the at least one hardware processor and storing programming instructions for execution by the at least one hardware processor, wherein the programming instructions, when executed, cause the at least one hardware processor to perform operations comprising:
        receiving a request to store a data record, wherein the data record comprises personally identifiable information for a person;
        dividing the data record into at least two portions of the personally identifiable information;
        selecting a database table cell for each portion of the at least two portions of the personally identifiable information, wherein the database table cells for different portions of the personally identifiable information for the same person are in different database rows, and wherein selecting the database table cell comprises:

determining a user ID associated with the personally identifiable information; and determining, based on the user ID using a hashing function, at least one of a row ID, a table ID, or a column ID of each database table cell storing the respective portion of the personally identifiable information; and storing the at least two portions of the personally identifiable information in the selected database table cells.

12. The device of claim 11, the operations further comprising:

receiving a query for the personally identifiable information;

determining the database table cells that store the at least two portions of the personally identifiable information for the personally identifiable information;

retrieving the at least two portions of the personally identifiable information from the database table cells;

combining the at least two portions of the personally identifiable information to reconstruct the data record; and outputting the reconstructed data record in response to the query.

13. The device of claim 11, wherein the at least two portions of the personally identifiable information comprise a first portion and a second portion, the first portion comprises a name of the person, and the second portion comprises at least one of an identification number, a phone number, a home address, or an email address of the person.

14. The device of claim 11, wherein the user ID is determined based on the personally identifiable information.

* * * * *